United States Patent [19]
Danis

[11] Patent Number: 6,098,995
[45] Date of Patent: Aug. 8, 2000

[54] VEHICLE SUSPENSION FOR PROVIDING KNEELING FUNCTION TO A VEHICLE HAVING A LOWERED FLOOR

[75] Inventor: Charles Danis, Quebec, Canada

[73] Assignee: Ricon Corporation, Panorama City, Calif.

[21] Appl. No.: 09/318,309

[22] Filed: May 25, 1999

[51] Int. Cl.[7] ................................................. B60G 11/26
[52] U.S. Cl. ............................ 280/6.152; 280/124.179
[58] Field of Search ............................ 280/6.15, 6.151, 280/6.152, 6.157, 127.179

[56] References Cited

U.S. PATENT DOCUMENTS

| | | | |
|---|---|---|---|
| 2,148,504 | 2/1939 | Richter | 280/6.151 |
| 3,727,939 | 4/1973 | Mykolenko | 280/124.179 |
| 4,067,558 | 1/1978 | Keijzer et al. | |
| 4,238,128 | 12/1980 | McKee | 280/6.152 |
| 4,248,455 | 2/1981 | Manning | 280/6.152 |
| 4,341,398 | 7/1982 | Condon et al. | 280/6.152 |
| 5,344,189 | 9/1994 | Tanaka et al. | 280/6.152 |

*Primary Examiner*—Kenneth R. Rice
*Attorney, Agent, or Firm*—Thomas I. Rozsa; Tony D. Chen; Jerry Fong

[57] ABSTRACT

An improved vehicle suspension system for providing kneeling function to a vehicle having a modified lower floor. The suspension system includes a pair of springs each of which is respectively mounted at one of the rear wheels of the vehicle. The system also includes a pair of air suspension members, each is respectively mounted at one of the rear wheels for partially supporting the load of the vehicle. A compressor is used for supplying air to the suspension members. An exhaust valve provides a path for air to be exhausted from the suspension members to bring the vehicle lower to the kneeling height, and thereby provides the kneeling function.

15 Claims, 4 Drawing Sheets

VEHICLE SUSPENSION FOR PROVIDING KNEELING FUNCTION TO A VEHICLE HAVING A LOWERED FLOOR

BACKGROUND OF THE INVENTION

1. Field of the Invention

The present invention generally relates to the field of vehicular wheel suspensions. More particularly, the present invention relates to the field of improved wheel suspensions for providing kneeling function to a vehicle, such as vans, having a lowered floor.

2. Description of the Prior Art

U.S. Pat. No. 4,067,558 issued to Keijzer et al. on Jan. 10, 1978 discloses a vehicle wheel suspension strut wherein the conventional suspension unit may be converted to an air leveling or air adjustable type suspension without requiring the discarding of the original shock absorber and/or related components. The converted wheel suspension incorporates virtually all of the original components, which are supplemented with a rolling type diaphragm element that cooperates with the original components in defining a variable volume air chamber which can be selectively supplied with compressed air or some other suitable fluid to provide the load adjustable characteristics. However, this suspension system does not provide a kneeling function, which causes the vehicle floor to be lowered when the vehicle is parked.

Specifically, rear suspensions on vehicles, such as vans, are well known in the art. These prior art rear suspensions on front wheel drive vehicles typically include a rear axle, two coil springs, two shock absorbers and a rear axle tie rod. One example is the General Motors (GM) Venture™ van, where the rear suspension has coil springs. However, this rear suspension has no kneeling function.

In mobility industry, a vehicle is often modified to have a lower floor with a floor level lower than the original one (for example approximately 12 inches lower) as to provide more interior height for physically challenged people. The initial vehicle's floor is cut and replaced by a new designed floor for the modification. To compensate and have enough clearance between the vehicle floor and the ground, prior art spacers are mounted relatively to the rear suspensions at the bottom of the coil springs to raise the modified vehicle body certain distance (for example approximately 2 inches). However, this modified vehicle has no kneeling function while it is needed on some lower floor mobility vans especially for which equipped with wheelchair lifts or ramps required to lower the vehicle floor even closer to the ground floor during entrance and exit of the vehicle. Therefore, it is desirable to provide a lower floor vehicle with a kneeling function.

SUMMARY OF THE INVENTION

The present invention is an improved vehicle suspension system for providing kneeling function to a vehicle having a modified lower floor.

The suspension system includes a pair of springs each of which is respectively mounted at one of the rear wheels of the vehicle. The system also includes a pair of air suspension members, each is respectively mounted at one of the rear wheels for partially supporting the load of the vehicle. A compressor is used for supplying air to the suspension members. An exhaust valve provides a path for air to be exhausted from the suspension members. A position sensor monitors the deviations of the vehicle height and send an electrical signal to a suspension control system when the vehicle height is away an original position. The exhaust valve serves two functions: (1) to exhaust the proper amount of air from the suspension members if the vehicle is above normal height; and (2) to exhaust all of the air from the suspension system and by doing so permit the vehicle to kneel when the function is desired.

It is an object of the present invention to provide an improved vehicle suspension system with a kneeling function utilized in a vehicle which has a modified lower floor.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
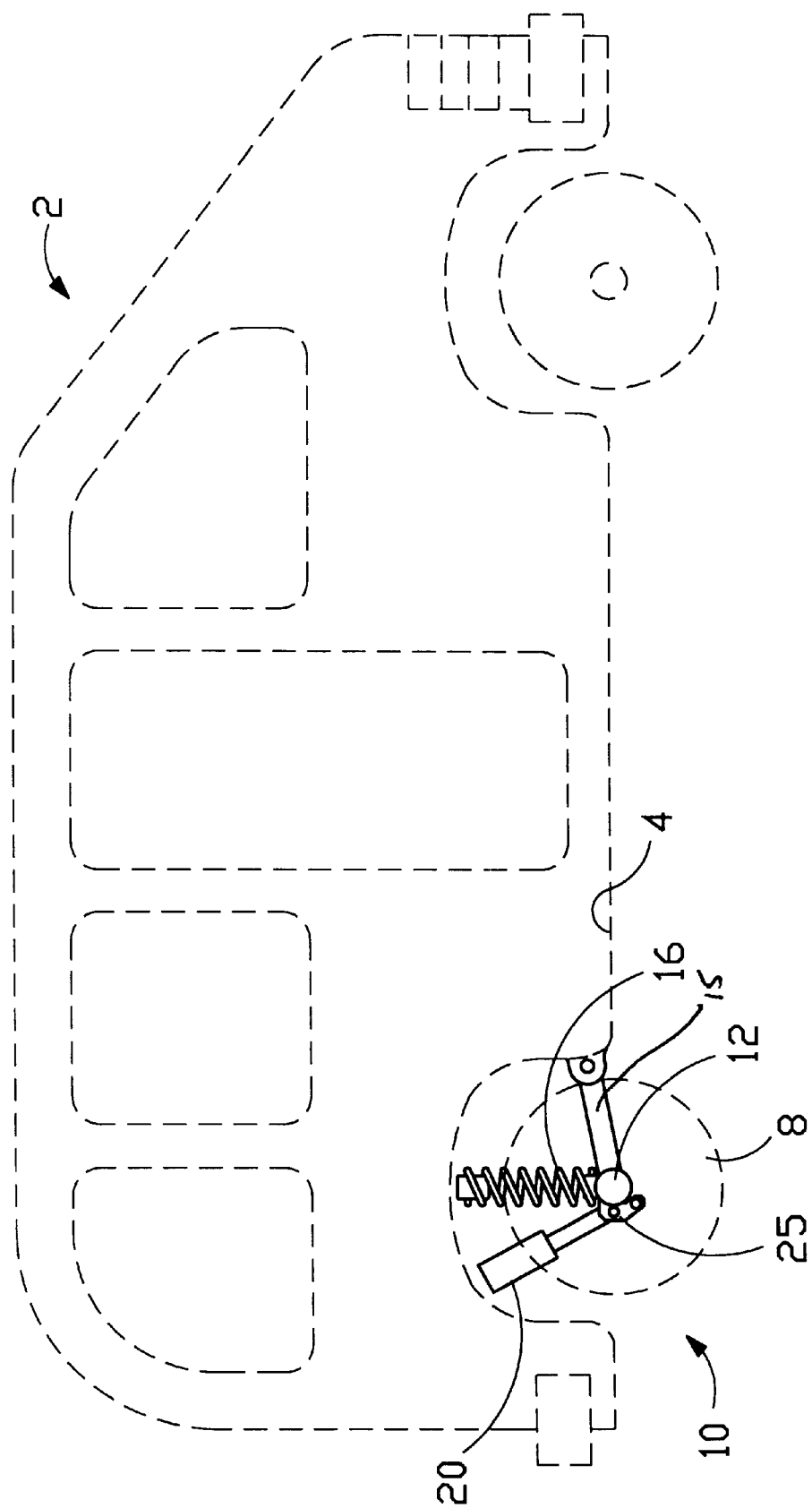
FIG. 1 is a schematic illustration of an improved vehicle suspension system incorporated with a vehicle having a modified lowered floor.
Figure 2:
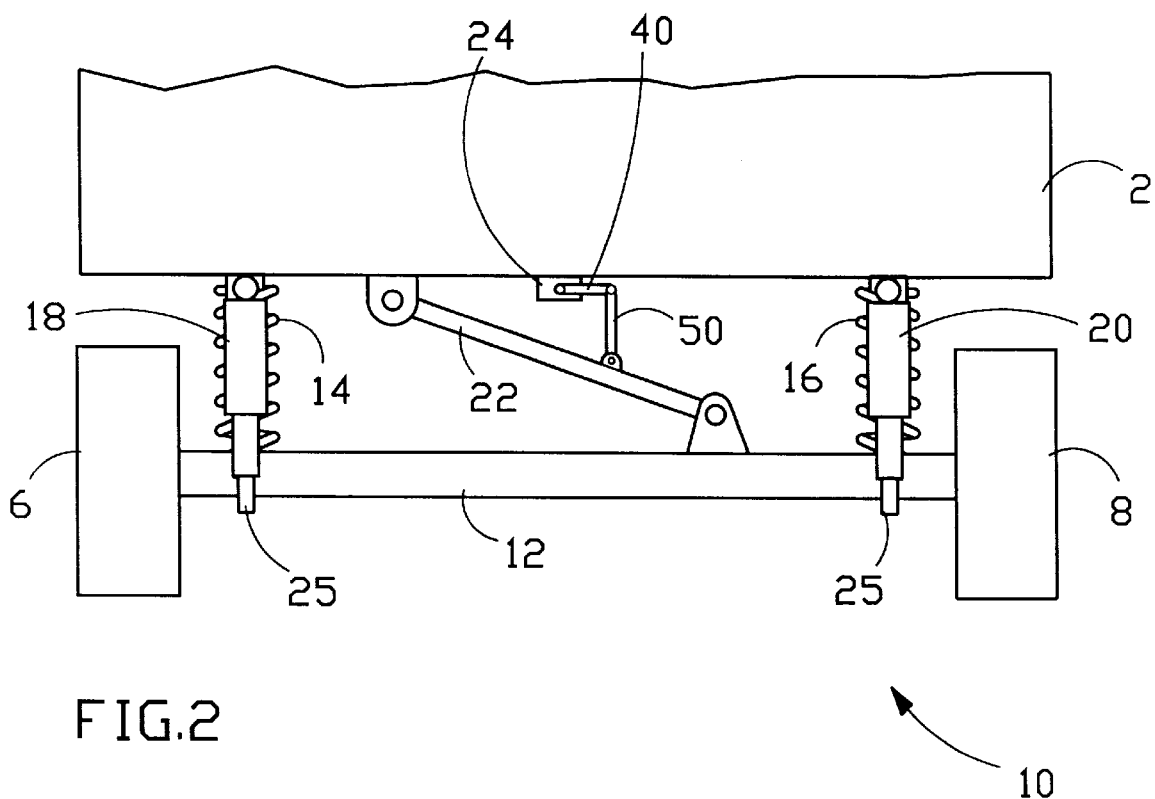
FIG. 2 is a rear schematic illustration of the improved vehicle suspension system.

Referring to FIGS. 1 and 2, there are schematically illustrated an improved vehicle suspension system 10 employed on a vehicle 2, such as a van, which has a modified lower floor 4 to accommodate the special needs, such as wheelchair access by people with limited mobility. The suspension system 10 includes a rear axle 12, two coil springs 14 and 16, two shock absorbers or suspension members 18 and 20, and a rear axle tie rod 22. Two control arms 15 (only one is shown) are welded to the axle housing, and are used to mount the axle 12 to the vehicle body. The control arms, with the rear axle tie rod 22 and shock absorbers 18 and 20, maintain the relationship of the rear axle 12 to the vehicle body.

Figure 3:
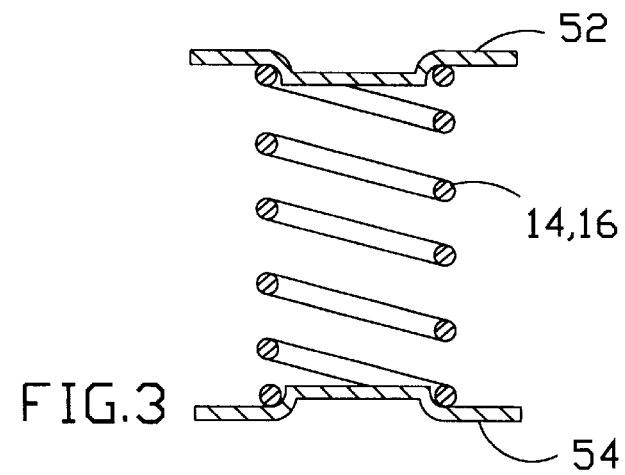
FIG. 3 is a cross-sectional of one of two coil springs, showing the coil spring seated between an upper seat and a lower seat.

Referring to FIGS. 2 and 3, the coil springs 14 and 16 are respectively mounted and located adjacent to each of the two rear wheels 6 and 8, where the rear axle 12 connects the two rear wheels together. The coil springs 14 and 16 are retained between an upper seat 52 which is welded in the underbody of the vehicle 2 and a lower seat 54 which is welded on top of the rear axle housing. The upper ends of the coil springs 14 and 16 are respectively mounted in the underbody spring pilots (not shown). The lower ends of the coil springs 14 and 16 are relatively sitting in the lower seats. The shock absorbers 18 and 20 are respectively mounted on the axle 12 adjacent to the two rear wheels 6 and 8. The shock absorbers 18 and 20 are mounted at the bottom by a bolt and nut to brackets 25 which are welded to the axle 12 and at the top by a bolt and nut underneath the vehicle body. The rear axle tie rod 22 is pivotable mounted between the axle 12 and the underbody of the vehicle 2.

Referring to FIG. 2, a height adjustment sensor 24 is applied for the vehicle suspension system and is adapted to connected between the rear axle tie rod 22 and the bottom of the vehicle 2. The upper side of the sensor 24 is mounted on the vehicle body while the lower side is pivotable connected to the rear axle tie rod 22 by two pivotable linkages 40 and 50.

Figure 4:
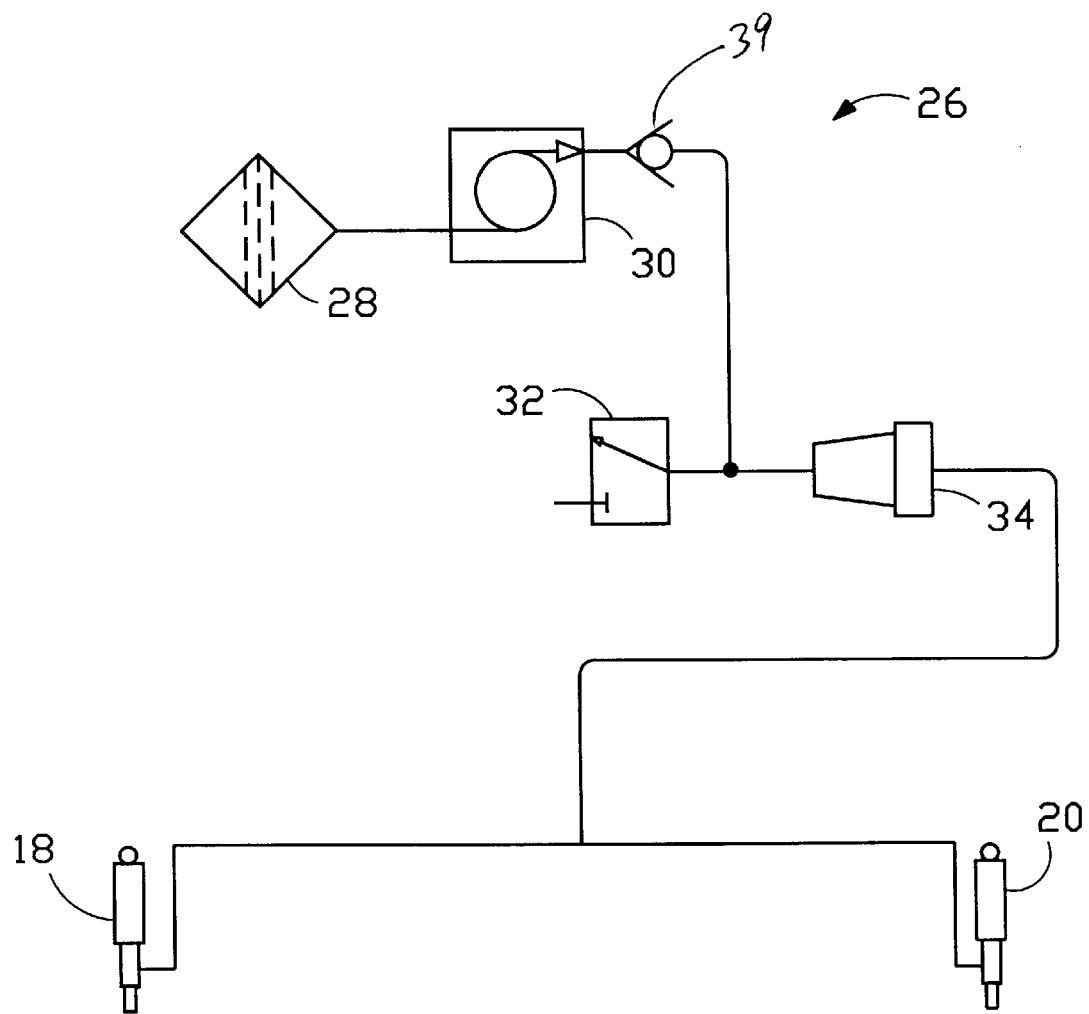
FIG. 4 is a diagram of a pneumatic level control system of the present invention improved vehicle suspension system.

Referring to FIG. 4, there is shown a diagram of the pneumatic level control system 26 which maintains a constant trim height at the rear suspension when the vehicle is loaded beyond a predetermined amount. The level control system 26 comprises the height sensor 24, the air shocks 18 and 20, and an air compressor assembly.

The compressor assembly comprises a compressor air filter 28, a compressor 30, an exhaust valve 32, an air dryer 34, and a check valve 39. The compressor air filter 28 is connected to the compressor 30, where the compressor air filter 28 is to remove dust and dirt from the incoming air as it is drawn into the compressor 30. Air is also exhausted from the system through the filter. The compressor 30 is attached to a bracket which is mounted at the left rear corner of the underbody of the vehicle. The compressor 30 contains intake and exhaust ports. The exhaust valve 32 releases air from the system 26 when energized. The air dryer 34 is directly attached to the compressor 30 for absorbing moisture from the compressed air before it is delivered to the air shocks 18 and 20. The moisture is later removed when the dry air is exhausted from the air shocks and passes back through the dryer 34. The exhaust valve 32 provides a path for air to be exhausted from the system 26. The exhaust valve 32 acts as a blow-off valve.

Referring again to FIGS. 2, 3 and 4, the height adjustment sensor 24 monitors and adjusts the vehicle body position level through the operation of the vehicle suspension system. In the lowered floor vehicle, the air shocks 18 and 20, and the springs 14 and 16 are both carried loads of the vehicle. The height adjustment sensor 24 dynamically receives vehicle level changes upon the position deviation from the linkages 40 and 50, and the tie rod 22. The sensor 24 will send an electrical signal to an electrical circuitry (not shown) based on the vehicle level change as to control the compressor 30 and the exhaust valve 32 of the suspension level control system. More specifically, as the load is added to the vehicle, the vehicle body lowers, causing the height sensor linkage 40 to rotate downwardly. If the vehicle body is lowered below the in-trim zone, the height sensor 24 activates the internal timing circuit. After the vehicle maintains this condition for a certain time, the height sensor 24 completes a circuit to ground, which in turn closes the compressor relay circuit to ground. The compressor 30 then supplies compressed air through the air dryer 34 to inflate the air shocks 18 and 20 as to rotate the height sensor linkage 40 upwardly. Once the height sensor linkage 40 reaches the in-trim zone indicating the vehicle is up to a pres-set level, the height sensor 24 then opens the compressor relay circuit, shutting off the compressor. The vehicle body is then back in the initial level.

Similarly, if the vehicle body is higher than the in-trim zone, the height sensor 24 will send an electrical signal to activate the exhaust valve 32 thus retracting the air shocks 18 and 20 to bring the vehicle down to the pres-set level. One thing needs to be pointed out that during the adjusting movements of the vehicle positions, the spring force created by the springs 14 and 16 are changing according to the positions. The air shocks 18 and 20 are provided relative adjusting pressures/forces, together with the springs 14 and 16 to withhold the total load from the vehicle.

Figure 5:
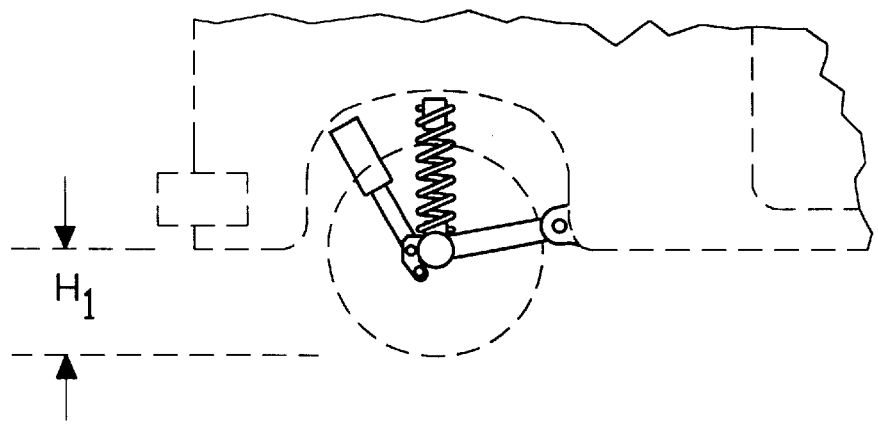
FIG. 5 is a schematic illustration of the improved vehicle suspension system, showing the floor height when the vehicle is in motion.
Figure 6:
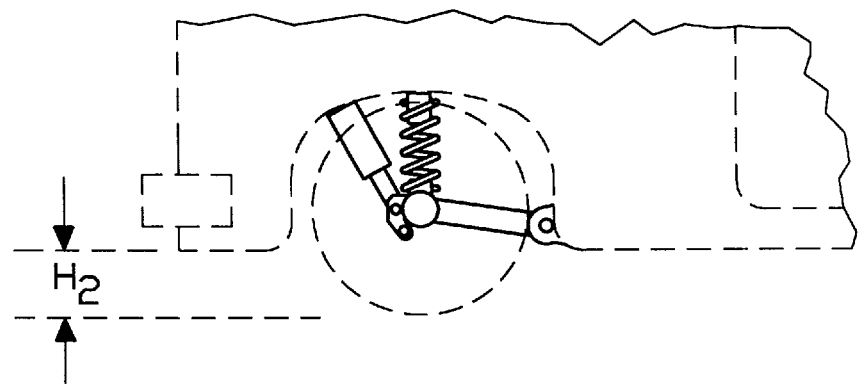
FIG. 6 is a schematic illustration of the improved vehicle suspension system, showing the kneeling height when the vehicle is parked or not moving.

Referring to FIGS. 5 and 6, the coil springs 16 and 18 are carefully chosen, in our application preferably with compress springs, to support the vehicle load. When the vehicle is in a normal motion operation, the vehicle floor is maintained at a level $H_1$ from the ground by the suspension system described above, which is the pre-set position providing adequate clearance between the vehicle body and the ground. The positive pressure is supplied to the air shocks 18 and 20. When the vehicle is parked for loading or unloading of passengers, especially to those equipped with mobility products for the physically challenged people, the kneeling function is sometime required on the vehicle. The kneeling operation is accomplished by exhausting the air shocks 18 and 20 even further to drop/lower or "kneeling" the vehicle floor to a kneeling height $H_2$ (see FIG. 6) which is lower than the level $H_1$. As an example, the normal lowered vehicle floor $H_1$ is approximately 10 inches from the ground.

Defined in detail, the present invention is a suspension system for use with a vehicle to provide a kneeling function, the vehicle comprising: (a) a body frame having a modified lower floor; (b) a pair of rear wheels mounted to the body frame and connected by a rear axle; (c) a pair of coil springs having a combined spring force for supporting the vehicle and maintaining the modified lower floor of the vehicle at a kneeling height, each suspension spring mounted between the rear axle and the body frame of the vehicle adjacent to a respective one of the rear wheels; (d) a pair of air shock absorbers each mounted between the rear axle and the body frame of the vehicle adjacent to a respective one of the pair of coil springs; (e) a compressor for supplying compressed air to the pair of air shock absorbers for causing the pair of air shock absorbers to provide additional support to the vehicle and maintain the modified lower floor of the vehicle at a desired height that is higher than the kneeling height; (f) an exhaust valve for providing a path for air to be exhausted from the pair of air shock absorbers; (g) a tie rod mounted to the bottom of the body frame and the rear axle; and (h) a height adjustment sensor mounted to the bottom of the body frame and connected to the tie rod for measuring the position of the body frame of the vehicle; (i) whereby when the vehicle is in motion, the suspension system can maintain the modified lower floor of the vehicle at the desired height to provide sufficient ground clearance, and when the vehicle is stationary, the suspension system can further lower the modified lower floor of the vehicle to the kneeling height for accommodating the loading and unloading of passengers.

Defined broadly, the present invention is a suspension system used in conjunction with a vehicle having a modified lower floor for providing a kneeling function thereof, where the vehicle has a pair of rear wheels connected by a rear axle, suspension system comprising: (a) a pair of suspension springs having a combined spring force for supporting the vehicle and maintaining the modified lower floor of the vehicle at a kneeling height, each suspension spring mountable between the rear axle and the body frame of the vehicle adjacent to a respective one of the rear wheels; (b) a pair of suspension members each mountable between the rear axle and the body frame of the vehicle adjacent to a respective one of the suspension springs; (c) compressor means for supplying compressed air to the pair of suspension members for causing the pair of suspension members to provide additional support to the vehicle and maintain the modified lower floor of the vehicle at a desired height that is higher than the kneeling height; and (d) the compressor means having an exhaust valve for providing a path for air to be exhausted from the pair of suspension members such that said modified lower floor of said vehicle is moved to the kneeling height; (e) whereby when the vehicle is in motion, the suspension system can maintain the modified lower floor of the vehicle at the desired height to provide sufficient ground clearance, and when the vehicle is stationary, the suspension system can further lower the modified lower floor of the vehicle to the kneeling height for accommodating the loading and unloading of passengers.

Defined more broadly, the present invention is a suspension system used in conjunction with a vehicle having a modified lower floor for providing a kneeling function thereof, where the vehicle has a body frame and two rear wheels connected by a rear axle, the suspension system comprising: (a) a pair of suspension springs having a combined spring force for supporting the vehicle and maintaining the modified lower floor of the vehicle at a kneeling height, each suspension spring mountable between the rear axle and the body frame of the vehicle adjacent to a respective one of the rear wheels; (b) a pair of suspension members each mountable between the rear axle and the body frame of the vehicle adjacent to a respective one of the suspension springs; (c) means connected to the pair of suspension members for causing the pair of suspension members to provide additional support to the vehicle and maintain the modified lower floor of the vehicle at a desired height that is higher than the kneeling height; and (d) the means connected to the pair of suspension members having further mechanism to withdraw the additional support provided by the pair of suspension members to the vehicle such that the modified lower floor of the vehicle is moved to the kneeling height; (e) whereby when the vehicle is in motion, the suspension system can maintain the modified lower floor of the vehicle at the desired height to provide sufficient ground clearance, and when the vehicle is stationary, the suspension system can further lower the modified lower floor of the vehicle to the kneeling height for accommodating the loading and unloading of passengers.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A suspension system used in conjunction with a vehicle having a modified lower floor for providing a kneeling function thereof, where the vehicle has a body frame and two rear wheels connected by a rear axle, the suspension system comprising:
    a. a pair of suspension springs having a combined spring force for supporting said vehicle and maintaining said modified lower floor of said vehicle at a kneeling height, each suspension spring mountable between said rear axle and said body frame of said vehicle adjacent to a respective one of said rear wheels;
    b. a pair of suspension members each mountable between said rear axle and said body frame of said vehicle adjacent to a respective one of said suspension springs;
    c. means connected to said pair of suspension members for causing said pair of suspension members to provide additional support to said vehicle and maintain said modified lower floor of said vehicle at a desired height that is higher than said kneeling height; and
    d. said means connected to said pair of suspension members having further mechanism to withdraw said additional support provided by said pair of suspension members to said vehicle such that said modified lower floor of said vehicle is moved to said kneeling height;
    e. whereby when said vehicle is in motion, said suspension system can maintain said modified lower floor of said vehicle at said desired height to provide sufficient ground clearance, and when said vehicle is stationary, said suspension system can further lower said modified lower floor of said vehicle to said kneeling height for accommodating the loading and unloading of passengers.

2. The suspension system in accordance with claim 1, wherein said further mechanism of said means comprises a compressor for supplying air to said pair of suspension members, an exhaust valve for providing a path for air to be exhausted from said pair of suspension members to bring said vehicle to said kneeling height.

3. The suspension system in accordance with claim 1, further comprising a tie rod mountable to the bottom of said body frame of said vehicle and said rear axle.

4. The suspension system in accordance with claim 3, further comprising a height adjustment sensor mountable to the bottom of said body frame of said vehicle and said tie rod for measuring the position of said vehicle.

5. The suspension system in accordance with claim 1, wherein said pair of suspension members are air shocks.

6. A suspension system used in conjunction with a vehicle having a modified lower floor for providing a kneeling function thereof, where the vehicle has a pair of rear wheels connected by a rear axle, suspension system comprising:
    a. a pair of suspension springs having a combined spring force for supporting said vehicle and maintaining said modified lower floor of said vehicle at a kneeling height, each suspension spring mountable between said rear axle and said body frame of said vehicle adjacent to a respective one of said rear wheels;
    b. a pair of suspension members each mountable between said rear axle and said body frame of said vehicle adjacent to a respective one of said suspension springs;
    c. compressor means for supplying compressed air to said pair of suspension members for causing said pair of suspension members to provide additional support to said vehicle and maintain said modified lower floor of said vehicle at a desired height that is higher than said kneeling height; and d. said compressor means having an exhaust valve for providing a path for air to be exhausted from said pair of suspension members such that said modified lower floor of said vehicle is moved to said kneeling height;

e. whereby when said vehicle is in motion, said suspension system can maintain said modified lower floor of said vehicle at said desired height to provide sufficient ground clearance, and when said vehicle is stationary, said suspension system can further lower said modified lower floor of said vehicle to said kneeling height for accommodating the loading and unloading of passengers.

7. The suspension system in accordance with claim 6, further comprising a compressor filter connected to said compressor means for removing dust and dirt from incoming air.

8. The suspension system in accordance with claim 6, further comprising an air dryer connected to said compressor means for absorbing moisture from the compressed air before it is delivered to said pair of suspension members.

9. The suspension system in accordance with claim 6, further comprising a tie rod mountable to the bottom of said body frame of said vehicle and said rear axle.

10. The suspension system in accordance with claim 8, further comprising a height adjustment sensor mountable to the bottom of said body frame of said vehicle and said tie rod for measuring the position of said vehicle.

11. The suspension in accordance with claim 6, wherein said pair of suspension members are air shocks.

12. A suspension system for use with a vehicle to provide a kneeling function, the vehicle comprising:

a. a body frame having a modified lower floor;

b. a pair of rear wheels mounted to said body frame and connected by a rear axle;

c. a pair of coil springs having a combined spring force for supporting said vehicle and maintaining said modified lower floor of said vehicle at a kneeling height, each suspension spring mounted between said rear axle and said body frame of said vehicle adjacent to a respective one of said rear wheels;

d. a pair of air shock absorbers each mounted between said rear axle and said body frame of said vehicle adjacent to a respective one of said pair of coil springs;

e. a compressor for supplying compressed air to said pair of air shock absorbers for causing said pair of air shock absorbers to provide additional support to said vehicle and maintain said modified lower floor of said vehicle at a desired height that is higher than said kneeling height;

f. an exhaust valve for providing a path for air to be exhausted from said pair of air shock absorbers;

g. a tie rod mounted to the bottom of said body frame and said rear axle; and h. a height adjustment sensor mounted to the bottom of said body frame and connected to said tie rod for measuring the position of said body frame of said vehicle;

i. whereby when said vehicle is in motion, said suspension system can maintain said modified lower floor of said vehicle at said desired height to provide sufficient ground clearance, and when said vehicle is stationary, said suspension system can further lower said modified lower floor of said vehicle to said kneeling height for accommodating the loading and unloading of passengers.

13. The vehicle in accordance with claim 12, further comprising a compressor air filter connected to said compressor for removing dust and dirt from incoming air.

14. The vehicle in accordance with claim 12, further comprising an air dryer connected to said compressor for absorbing moisture from the compressed air before it is delivered to said pair of air shock absorbers.

15. The vehicle in accordance with claim 12, wherein said pair of air shock absorbers are telescopic.

* * * * *